United States Patent
Lin

(10) Patent No.: US 12,378,412 B2
(45) Date of Patent: Aug. 5, 2025

(54) RESIN COMPOSITION AND ARTICLE MADE THEREFROM

(71) Applicant: Elite Material Co., Ltd., Taoyuan (TW)

(72) Inventor: Chih-Wei Lin, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 489 days.

(21) Appl. No.: 18/080,885

(22) Filed: Dec. 14, 2022

(65) Prior Publication Data
US 2024/0158634 A1 May 16, 2024

Related U.S. Application Data

(60) Provisional application No. 63/419,394, filed on Oct. 26, 2022.

(51) Int. Cl.
| | | |
|---|---|---|
| *C08L 79/08* | (2006.01) | |
| *C08G 73/06* | (2006.01) | |
| *C08G 73/12* | (2006.01) | |
| *C08J 5/24* | (2006.01) | |

(52) U.S. Cl.
CPC .......... *C08L 79/08* (2013.01); *C08G 73/0611* (2013.01); *C08G 73/12* (2013.01); *C08G 73/121* (2013.01); *C08G 73/128* (2013.01); *C08J 5/244* (2021.05); *C08L 79/085* (2013.01); *C08J 2379/08* (2013.01); *C08J 2479/08* (2013.01); *C08J 2483/04* (2013.01); *C08L 2205/025* (2013.01); *C08L 2205/03* (2013.01)

(58) Field of Classification Search
CPC ... C08L 79/085; C08G 73/0611; C08G 73/12; C08G 73/121; C08G 73/128
See application file for complete search history.

(56) References Cited

U.S. PATENT DOCUMENTS

2014/0192501 A1* 7/2014 Kotake ................ C08G 73/106
524/588

FOREIGN PATENT DOCUMENTS

JP S62-2246933 A * 10/1987

OTHER PUBLICATIONS

Partial machine translation of JP S62-2246933 A (Year: 1987).*

* cited by examiner

*Primary Examiner* — Kregg T Brooks
(74) *Attorney, Agent, or Firm* — MUNCY, GEISSLER, OLDS & LOWE, P.C.

(57) ABSTRACT

A resin composition includes a prepolymer which is prepared from a mixture subjected to a prepolymerization reaction, the mixture including 100 parts by weight of a first maleimide resin, 40 to 60 parts by weight of a siloxane compound and 10 to 30 parts by weight of a diamine compound, wherein: the first maleimide resin includes bisphenol A diphenyl ether bismaleimide; the siloxane compound includes a compound of Formula (I), having a molecular weight of 2200 to 2600 g/mol; and the diamine compound includes 4-aminophenyl-4-aminobenzoate. The resin composition may be used to make various articles, such as a varnish, a prepreg, a resin film, a laminate or a printed circuit board, and at least one of the following properties can be improved, including resin compatibility and X-axis coefficient of thermal expansion.

8 Claims, No Drawings

RESIN COMPOSITION AND ARTICLE MADE THEREFROM

CROSS-REFERENCE TO RELATED APPLICATION

This application claims the priority benefits of U.S. provisional application No. 63/419,394, filed on Oct. 26, 2022. The entirety the above-mentioned patent application is hereby incorporated by reference herein and made a part of this specification.

BACKGROUND

1. Field of the Disclosure

The present disclosure relates to a resin composition and more particularly to a resin composition useful for preparing a varnish, a prepreg, a resin film, a laminate or a printed circuit board.

2. Description of Related Art

In recent years, due to the development of electronic signal transmission toward 5G and the trend of miniaturization and high performance of electronic equipment, communication devices and personal computers, circuit boards were also developed toward multi-layer configuration, high density trace interconnection, and high speed signal transmission, thereby presenting higher challenges to the overall performance of circuit laminates such as copper-clad laminates. In order to prevent deformation of copper-clad laminates due to the use of high temperature processes during product fabrication and the abnormal signal transmission resulting from defective products, there is a need for developing materials for copper-clad laminates with lower coefficient of thermal expansion. Therefore, there is a need for solving one or more of the above-mentioned problems.

SUMMARY

To overcome the problems of prior arts, particularly one or more above-mentioned technical problems facing conventional materials, it is a primary object of the present disclosure to provide a resin composition and an article made therefrom which may overcome at least one of the above-mentioned technical problems.

To achieve the above-mentioned object, the present disclosure provides a resin composition, comprising a prepolymer which is prepared from a mixture subjected to a prepolymerization reaction, the mixture comprising 100 parts by weight of a first maleimide resin, 40 to 60 parts by weight of a siloxane compound and 10 to 30 parts by weight of a diamine compound, wherein:
the first maleimide resin comprises bisphenol A diphenyl ether bismaleimide;
the siloxane compound comprises a compound of Formula (I), having a molecular weight of 2200 to 2600 g/mol,

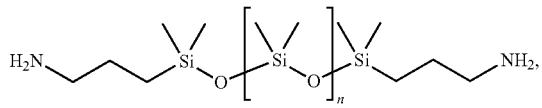

Formula (I)

wherein 26≤n≤32, and n is a positive integer; and
the diamine compound comprises 4-aminophenyl-4-aminobenzoate.

For example, in one embodiment, the resin composition further comprises a second maleimide resin.

For example, in one embodiment, the resin composition comprises 100 parts by weight of the prepolymer and 10 to 35 parts by weight of the second maleimide resin.

For example, in one embodiment, the second maleimide resin comprises polyphenylmethane maleimide, biphenyl aralkyl maleimide, diallyl nadiimide or a combination thereof.

For example, in one embodiment, the resin composition further comprises inorganic filler, flame retardant, curing accelerator, polymerization inhibitor, solvent, silane coupling agent, coloring agent, toughening agent or a combination thereof.

To achieve the above-mentioned objects, the present disclosure further provides an article made from the resin composition, including a varnish, a prepreg, a resin film, a laminate or a printed circuit board.

For example, in one embodiment, articles made from the resin composition disclosed herein have one, more or all of the following properties:
  no layer separation occurs after standing still the varnish at room temperature for 3 hours in a resin compatibility test; and
  an X-axis coefficient of thermal expansion as measured by reference to IPC-TM-650 2.4.24.5 of less than or equal to 4.21 ppm/° C.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that transitional phrases such as "consisting essentially of" and "consisting of" are also disclosed and included.

As used herein, the term "and" or any other variant thereof is used to connect parallel sentence components, and there is no distinction between the front and rear components. The meaning of the parallel sentence components does not change in the grammatical sense after the position is exchanged.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, an alkyl group and an alkenyl group described herein are construed to encompass various isomers thereof. For example, a propyl group is construed to encompass n-propyl and iso-propyl.

As used herein, a prepolymer refers to a product, derived from a compound or a mixture (monomer) that is subjected to prepolymerization (i.e., partial polymerization), which contains unreacted reactive functional groups or has the potential to undergo further polymerization. For example, the progress of the prepolymerization reaction may be confirmed and controlled as needed by determining the molecular weight or the level of viscosity. Prepolymerization reaction disclosed herein may be initiated by the use of solvent and heating or by a thermal melting reaction, but not limited thereto. For example, prepolymerization by the use of solvent and heating refers to dissolving the raw material in a solvent, optionally adding a catalyst or a polymerization inhibitor, followed by heating after all components are melted in the solvent, so as to initiate the prepolymerization reaction. Prepolymerization by a thermal melting reaction refers to heating to melt the raw material and at the same time initiate the prepolymerization reaction. The product after prepolymerization (i.e., the prepolymer) has a molecular weight of greater than that of the compound monomer or mixture monomer prior to prepolymerization and may be analyzed by a gel permeation chromatograph (GPC). In the graph of retention time (X-axis) and molecular weight (Y-axis), the distribution peak of molecular weight of the prepolymer is located closer to the Y-axis (shorter retention time), and the distribution peak of molecular weight of the monomer is located behind (longer retention time). In addition, the prepolymer obtained has a wider distribution of molecular weight that contains multiple adjacent peaks, while the monomer has a narrower distribution of molecular weight that contains only one peak.

To those of ordinary skill in the art to which this disclosure pertains, a resin composition containing an additive and three compounds (e.g., A, B and C), a total of four components, is different form a resin composition containing the additive and a prepolymer formed by the three compounds (e.g., A, B and C), a total of two components, as they are completely different from each other in the aspects of preparation method, physical or chemical properties of the resin composition and properties of an article or product made therefrom. For example, the former involves mixing A, B, C and the additive to form the resin composition; in contrast, the latter involves first subjecting a mixture comprising A, B and C to a prepolymerization reaction at proper conditions to form a prepolymer and then mixing the prepolymer with the additive to form the resin composition. For example, to those of ordinary skill in the art to which this disclosure pertains, the two resin compositions have completely different compositions; in addition, because the prepolymer formed by A, B and C functions completely different from A, B and C individually or collectively in the resin composition, the two resin compositions should be construed as completely different chemical substances and have completely different chemical statuses. For example, to those of ordinary skill in the art to which this disclosure pertains, because the two resin compositions are completely different chemical substances, articles made therefrom will not have the same properties. For example, to a resin composition containing a crosslinking agent and a prepolymer formed by A, B and C, since A, B and C have been partially reacted or converted during the prepolymerization reaction to form the prepolymer, during the process of heating to semi-cure the resin composition at a high temperature condition, a partial crosslinking reaction occurs between the prepolymer and the crosslinking agent but not between A, B and C individually and the crosslinking agent. As such, articles made from the two resin compositions will be completely different and have completely different properties.

As used herein, part(s) by weight represents weight part(s) in any weight unit, such as but not limited to gram, kilogram, pound and so on. For example, 100 parts by weight of the prepolymer may represent 100 grams of the prepolymer, 100 kilograms of the prepolymer or 100 pounds of the prepolymer, but not limited thereto.

The following embodiments and examples are illustrative in nature and are not intended to limit the present disclosure and its application. In addition, the present disclosure is not bound by any theory described in the background and summary above or the following embodiments or examples.

As described above, the primary object of the present disclosure is to provide a resin composition, comprising a prepolymer which is prepared from a mixture subjected to a prepolymerization reaction, the mixture comprising 100 parts by weight of a first maleimide resin, 40 to 60 parts by weight (such as but not limited to 40, 45, 50, 55 or 60 parts by weight) of a siloxane compound and 10 to 30 parts by weight (such as but not limited to 10, 15, 20, 25 or 30 parts by weight) of a diamine compound, wherein:
the first maleimide resin comprises bisphenol A diphenyl ether bismaleimide (a.k.a. 2,2'-bis-[4-(4-maleimidephenoxy)phenyl]propane);
the siloxane compound comprises a compound of Formula (I), having a molecular weight of 2200 to 2600 g/mol, Formula (I)

$$H_2N\text{-}Si(O\text{-}Si)_n\text{-}O\text{-}Si\text{-}NH_2$$

wherein 26≤n≤32, and n is a positive integer; and
the diamine compound comprises 4-aminophenyl-4-aminobenzoate.

In addition to the first maleimide resin, the siloxane compound and the diamine compound, the mixture used for preparing the prepolymer may further optionally comprise other component(s).

For example, in one embodiment, the mixture further comprises a solvent used to control the degree of the prepolymerization reaction or the reactivity of the prepolymer. The type and amount of the solvent are not particularly limited and may be determined by those skilled in the art according to the viscosity as needed. For example, the solvent may comprise propylene glycol monomethyl ether acetate, dimethyl acetamide, methyl ethyl ketone, cyclohexanone, N-methyl-2-pyrrolidone or a combination thereof. For example, in one embodiment, relative to 100 parts by weight of the first maleimide resin, the solvent may comprise 100 to 300 parts by weight of propylene glycol monomethyl ether acetate. Preferably, relative to 100 parts by weight of the first maleimide resin, the solvent may comprise 150 to 250 parts by weight of propylene glycol monomethyl ether acetate, but not limited thereto.

In the present disclosure, the prepolymer is prepared by subjecting the mixture to a prepolymerization reaction. For example, various components in the mixture are well mixed and stirred in the solvent and then heated to 80° C. to 140° C. for constantly reacting for 0.5 to 5 hours to obtain a transparent clear dark brown solution, which is the resinous solution of the prepolymer. For example, the prepolymerization reaction may be carried out at a temperature of 80° C., 90° C., 100° C., 110° C., 115° C., 120° C., 130° C. or 140° C. For example, the duration of the prepolymerization reaction may be 0.5 hour, 1 hour, 2 hours, 3 hours, 4 hours or 5 hours.

For example, the mixture containing the first maleimide resin, the siloxane compound and the diamine compound may be subjected to the prepolymerization reaction under any proper conditions so as to form the prepolymer. In one embodiment, the process for preparing the prepolymer includes dissolving the first maleimide resin in a solvent, adding the siloxane compound and the diamine compound and stirring and mixing until fully dissolved, followed by reacting for 0.5 to 5 hours at high temperature (such as 80° C. to 140° C.), so as to obtain the prepolymer.

According to the present disclosure, the method of preparing the aforesaid resin composition comprises: prepolymerizing the mixture to obtain the prepolymer and then optionally mixing the prepolymer and the additive to obtain the resin composition. For example, in one embodiment, the mixture is subjected to the prepolymerization reaction at 80° C. to 140° C. for 0.5 to 5 hours to prepare the prepolymer.

Unless otherwise specified, in the present disclosure, the resin composition may comprise the prepolymer and one or more additives. The additive refers to any component useful with the prepolymer to form the resin composition and may be a component with or without the potential of reacting with the prepolymer. For example, in one embodiment, the additive may be a second maleimide resin, which may be the same or different from the first maleimide resin. For example, in one embodiment, the additive may also be inorganic filler, flame retardant, curing accelerator, polymerization inhibitor, solvent, silane coupling agent, coloring agent, toughening agent or a combination thereof, but not limited thereto.

For example, in one embodiment, the resin composition comprises the prepolymer and a second maleimide resin. Relative to 100 parts by weight of the prepolymer, for example, the amount of the second maleimide resin may be for example 10 to 35 parts by weight (such as but not limited to 10, 15, 20, 25, 30 or 35 parts by weight). The type of the second maleimide resin is not particularly limited and may be any maleimide resins in the art to which this disclosure pertains useful for preparing a prepreg, a resin film, a laminate or a printed circuit board. For example, the second maleimide resin may comprise polyphenylmethane maleimide, biphenyl aralkyl maleimide, diallyl nadiimide or a combination thereof.

For example, the inorganic filler may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, or calcined kaolin. Moreover, the inorganic filler can be spherical, fibrous, plate-like, particulate, flake-like or whisker-like in shape and can be optionally pretreated by a silane coupling agent. For example, in one embodiment, relative to the total amount of "all other components" in the resin composition, the resin composition of the present disclosure may further comprise 1.2 time to 2.5 times of the aforesaid total amount of "all other components" of an inorganic filler, preferably 1.7 times to 2.0 times of the aforesaid total amount of an inorganic filler, but not limited thereto. For example, except for curing accelerator, inorganic filler and solvent in the resin composition, other components are collectively called "all other components".

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), and a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac). For example, in one embodiment, relative to 100 parts by weight of the prepolymer, the resin composition of the present disclosure may further comprise 5 parts by weight to 100 parts by weight of flame retardant, preferably 10 parts by weight to 30 parts by weight of flame retardant, but not limited thereto.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methyl imidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl) benzene or a combination thereof. For example, in one embodiment, relative to 100 parts by weight of the prepolymer, the resin composition of the present disclosure may further comprise 0.05 part by weight to 1.0 part by weight of curing accelerator, preferably 0.2 part by weight to 0.5 part by weight of curing accelerator, but not limited thereto.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, 0-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethylpyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, in one embodiment, relative to 100 parts by weight of the prepolymer, the resin composition of the present disclosure may further comprise 0.001 part by weight to 5 parts by weight of polymerization inhibitor, preferably 0.01 part by weight to 3 parts by weight of polymerization inhibitor, but not limited thereto.

For example, the solvent suitable for the resin composition of the present disclosure is not particularly limited and may be any solvent suitable for dissolving the resin composition disclosed herein, examples including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof. For example, in one embodiment, relative to the total amount of "all other components" in the resin composition, the resin composition of the present disclosure may further comprise 1.0 time to 2.0 times of the aforesaid total amount of solvent, preferably 1.4 times to 1.6 times of the aforesaid total amount of solvent, but not limited thereto. For example, except for curing accelerator, inorganic filler and solvent in the resin composition, other components are collectively called "all other components".

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane. For example, in one embodiment, relative to 100 parts by weight of the prepolymer, the resin composition of the present disclosure may further comprise 0.001 part by weight to 2 parts by weight of silane coupling agent, preferably 0.01 part by weight to 1 part by weight of silane coupling agent, but not limited thereto.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof. For example, in one embodiment, relative to 100 parts by weight of the prepolymer, the resin composition of the present disclosure may further comprise 1 part by weight to 20 parts by weight of toughening agent, preferably 3 parts by weight to 10 parts by weight of toughening agent, but not limited thereto.

The resin composition of various embodiments may be processed to make different articles, such as those suitable for use as components in electronic products, including but not limited to a varnish, a prepreg, a resin film, a laminate or a printed circuit board.

For example, the resin compositions of various embodiments of the present disclosure may be added with solvent to make a varnish.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making a prepreg may be for example 120° C. to 180° C., preferably 120° C. to 160° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 180° C. and 240° C. and preferably between 200° C. and 230° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment, the resin composition disclosed herein may achieve improvement in one or more of the following properties: resin compatibility, X-axis coefficient of thermal expansion, etc.

For example, the resin composition according to the present disclosure or the article made therefrom may achieve one, more or all of the following properties:
- no layer separation occurs after standing still the varnish at room temperature for 3 hours in a resin compatibility test; and
- an X-axis coefficient of thermal expansion as measured by reference to IPC-TM-650 2.4.24.5 of less than or equal to 4.21 ppm/° C., such as between 2.85 ppm/° C. and 4.21 ppm/° C.

Various prepolymers were prepared according to the amount of major reactants (monomers) listed in Table 1 and Table 2 and the descriptions in Preparation Example 1 to Preparation Example 16. In addition, raw materials below were used to prepare the resin compositions of various Examples and Comparative Examples of the present disclosure according to the amount listed in Table 3 to Table 5 and further fabricated to prepare test samples.

Materials and reagents used in Preparation Examples of prepolymer and Examples and Comparative Examples of resin composition disclosed herein are listed below:

- BMI-80: bisphenol A diphenyl ether bismaleimide (a.k.a. 2,2'-bis-[4-(4-maleimide phenoxy)phenyl]propane), available from K.I Chemical Industry Co., Ltd.
- MIR-5000: maleimide resin of Formula (II), available from Nippon Kayaku,

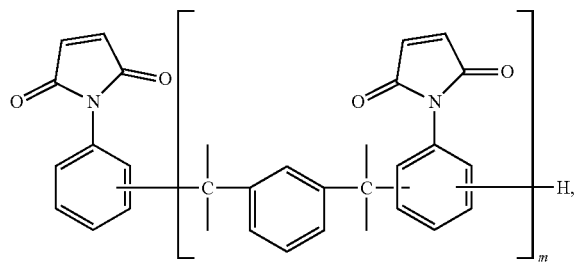

Formula (II)

wherein 1≤m≤5.

- BMI-2300: polyphenylmethane maleimide, available from Daiwakasei Industry Co., Ltd.
- MIR-3000: biphenyl aralkyl maleimide, available from Nippon Kayaku.
- BANI-M: diallyl nadiimide, as shown by Formula (III), available from Maruzen Petrochemical Co., Ltd.,

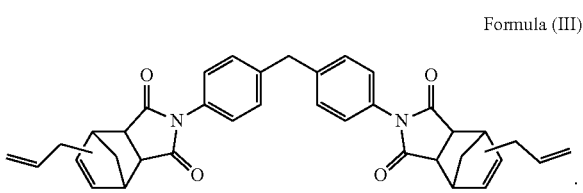

Formula (III)

- NH 30 D: siloxane compound of Formula (I), having a molecular weight of 2200 to 2600 g/mol, available from WACKER,

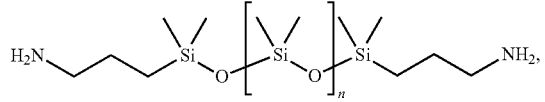

Formula (I)

wherein 26≤n≤32, and n is a positive integer.

- NH 15 D: siloxane compound of Formula (I), having a molecular weight of 1000 to 1200 g/mol, available from WACKER.
- NH 40 D: siloxane compound of Formula (I), having a molecular weight of 2900 to 3300 g/mol, available from WACKER.
- X-22-161A: amino group-terminated siloxane compound, having a molecular weight of about 1600 g/mol, available from Shin-Etsu Chemical Co., Ltd.
- X-22-161B: amino group-terminated siloxane compound, having a molecular weight of about 3000 g/mol, available from Shin-Etsu Chemical Co., Ltd.
- APAB: 4-aminophenyl-4-aminobenzoate, as shown by Formula (IV), available from UFC Corp.,

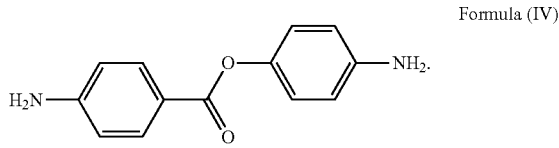

Formula (IV)

- AB-TFMB: N,N'-[2,2'-bis(trifluoromethyl)-[1,1'-biphenyl]-4,4'-diyl]bis[4-amino benzamide], available from Tong Sing Chemicals Co., Ltd.
- AB-HQ: 1,4-phenylene-di-4-aminobenzoate, available from Tong Sing Chemicals Co., Ltd.
- MOEA: 3,3'-diethyl-4,4'-diaminodiphenylmethane, available from Kingyorker Enterprise Co., Ltd.
- 4,4'-Diaminobenzoylaniline: commercially available.
- 2PHZ-PW: 2-phenyl-4,5-dihydrocarbylmethylimidazole, available from Shikoku Chemicals Corp.
- SC2050 SMJ: spherical silica pre-treated by acrylic silane coupling agent, available from Admatechs. In the Tables, the amount symbol "R" of inorganic filler represents the total amount of "all other components" in the resin composition of each Example or each Comparative Example. Except for curing accelerator, inorganic filler and solvent in the resin composition, the remaining other components are collectively called "all other components". In the Tables, the amount symbol "R*180%" of inorganic filler represents the amount of inorganic filler is 1.8 times of the aforesaid "R". For example, in Example E1, R*180% represents that the amount of inorganic filler is 180 parts by weight (100 parts by weight multiplied by 180%). Similarly, in Example E6, R*180% represents that the amount of inorganic filler is 198 parts by weight (110 parts by weight multiplied by 180%).
- MEK: methyl ethyl ketone, commercially available. In the Tables, the amount symbol "R*150%" of solvent represents the amount of solvent is 1.5 times of the aforesaid "R". For example, in Example E1, R*150% represents that the amount of solvent is 150 parts by weight (100 parts by weight multiplied by 150%). Similarly, in Example E6, R*150% represents that the amount of solvent is 165 parts by weight (110 parts by weight multiplied by 150%).
- Propylene glycol monomethyl ether acetate: commercially available.

Various prepolymers were prepared according to the descriptions in Preparation Example 1 to Preparation Example 16 using the amount of monomers for prepolymerization as listed in Table 1 and Table 2.

Preparation Example 1

In a reaction tank, 186 parts by weight of propylene glycol monomethyl ether acetate, 100 parts by weight of BMI-80, 50 parts by weight of NH 30 D and 20 parts by weight of APAB were added, well mixed and dissolved by heating to 115° C., followed by reacting at the constant temperature for 4 hours, and then cooled to room temperature to obtain the solution of Prepolymer 1.

Preparation Example 2

The 50 parts by weight of NH 30 D in Preparation Example 1 was replaced with 40 parts by weight of NH 30

D, and the other components and steps were the same as in Preparation Example 1 to obtain the solution of Prepolymer 2.

Preparation Example 3

The 50 parts by weight of NH 30 D in Preparation Example 1 was replaced with 60 parts by weight of NH 30 D, and the other components and steps were the same as in Preparation Example 1 to obtain the solution of Prepolymer 3.

Preparation Example 4

The 20 parts by weight of APAB in Preparation Example 1 was replaced with 10 parts by weight of APAB, and the other components and steps were the same as in Preparation Example 1 to obtain the solution of Prepolymer 4.

Preparation Example 5

The 20 parts by weight of APAB in Preparation Example 1 was replaced with 30 parts by weight of APAB, and the other components and steps were the same as in Preparation Example 1 to obtain the solution of Prepolymer 5.

Preparation Example 6

The 50 parts by weight of NH 30 D in Preparation Example 1 was replaced with 50 parts by weight of NH 15 D, and the other components and steps were the same as in Preparation Example 1 to obtain the solution of Prepolymer 6.

Preparation Example 7

The 50 parts by weight of NH 30 D in Preparation Example 1 was replaced with 50 parts by weight of NH 40 D, and the other components and steps were the same as in Preparation Example 1 to obtain the solution of Prepolymer 7.

Preparation Example 8

The 50 parts by weight of NH 30 D in Preparation Example 1 was replaced with 50 parts by weight of X-22-161A, and the other components and steps were the same as in Preparation Example 1 to obtain the solution of Prepolymer 8.

Preparation Example 9

The 50 parts by weight of NH 30 D in Preparation Example 1 was replaced with 50 parts by weight of X-22-161B, and the other components and steps were the same as in Preparation Example 1 to obtain the solution of Prepolymer 9.

Preparation Example 10

The 20 parts by weight of APAB in Preparation Example 1 was replaced with 20 parts by weight of AB-TFMB, and the other components and steps were the same as in Preparation Example 1 to obtain the solution of Prepolymer 10.

Preparation Example 11

The 20 parts by weight of APAB in Preparation Example 1 was replaced with 20 parts by weight of AB-HQ, and the other components and steps were the same as in Preparation Example 1 to obtain the solution of Prepolymer 11.

Preparation Example 12

The 20 parts by weight of APAB in Preparation Example 1 was replaced with 20 parts by weight of MOEA, and the other components and steps were the same as in Preparation Example 1 to obtain the solution of Prepolymer 12.

Preparation Example 13

The 50 parts by weight of NH 30 D and the 20 parts by weight of APAB in Preparation Example 1 were respectively replaced with 50 parts by weight of X-22-161B and 20 parts by weight of MOEA, and the other components and steps were the same as in Preparation Example 1 to obtain the solution of Prepolymer 13.

Preparation Example 14

The 50 parts by weight of NH 30 D in Preparation Example 4 was replaced with 30 parts by weight of NH 30 D, and the other components and steps were the same as in Preparation Example 4 to obtain the solution of Prepolymer 14.

Preparation Example 15

The 20 parts by weight of APAB in Preparation Example 1 was replaced with 20 parts by weight of 4,4'-diaminobenzoylaniline, and the other components and steps were the same as in Preparation Example 1 to obtain the solution of Prepolymer 15.

Preparation Example 16

The 100 parts by weight of BMI-80 in Preparation Example 1 was replaced with 100 parts by weight of MIR-5000, and the other components and steps were the same as in Preparation Example 1 to obtain the solution of Prepolymer 16.

Compositions of prepolymers are listed below (in part by weight):

TABLE 1

| Prepolymer compositions (in part by weight) | | | | | | | | | |
|---|---|---|---|---|---|---|---|---|---|
| Component | Name | 1 | 2 | 3 | 4 | 5 | 6 | 7 | 8 |
| first maleimide resin | BMI-80 | 100 | 100 | 100 | 100 | 100 | 100 | 100 | 100 |
| | MIR-5000 | | | | | | | | |
| siloxane compound | NH 30 D | 50 | 40 | 60 | 50 | 50 | | | |
| | NH 15 D | | | | | | 50 | | |
| | NH 40 D | | | | | | | 50 | |

TABLE 1-continued

Prepolymer compositions (in part by weight)

| Component | Name | 1 | 2 | 3 | 4 | 5 | 6 | 7 | 8 |
|---|---|---|---|---|---|---|---|---|---|
| diamine compound | X-22-161A | | | | | | | | 50 |
| | X-22-161B | | | | | | | | |
| | APAB | 20 | 20 | 20 | 10 | 30 | 20 | 20 | 20 |
| | AB-TFMB | | | | | | | | |
| | AB-HQ | | | | | | | | |
| | MOEA | | | | | | | | |
| | 4,4'-diaminobenzoylaniline | | | | | | | | |

TABLE 2

Prepolymer compositions (in part by weight)

| Component | Name | 9 | 10 | 11 | 12 | 13 | 14 | 15 | 16 |
|---|---|---|---|---|---|---|---|---|---|
| first maleimide resin | BMI-80 | 100 | 100 | 100 | 100 | 100 | 100 | 100 | |
| | MIR-5000 | | | | | | | | 100 |
| siloxane compound | NH 30 D | | 50 | 50 | 50 | | 30 | 50 | 50 |
| | NH 15 D | | | | | | | | |
| | NH 40 D | | | | | | | | |
| | X-22-161A | | | | | | | | |
| | X-22-161B | 50 | | | | 50 | | | |
| diamine compound | APAB | 20 | | | | | 10 | | 20 |
| | AB-TFMB | | 20 | | | | | | |
| | AB-HQ | | | 20 | | | | | |
| | MOEA | | | | 20 | 20 | | | |
| | 4,4'-diaminobenzoylaniline | | | | | | | 20 | |

Compositions (in part by weight) and test results of resin compositions of Examples and Comparative Examples are listed below, wherein the part by weight refers to the amount, in part by weight, of each component with a solid content of 100%. For example, Example E1 contains 100 parts by weight of Prepolymer 1, indicating the amount of Prepolymer 1, with a solid content of 100%, is 100 parts by weight.

TABLE 3

Resin compositions of Examples (in part by weight) and test results

| Component | Name | E1 | E2 | E3 | E4 | E5 | E6 | E7 | E8 |
|---|---|---|---|---|---|---|---|---|---|
| prepolymer of the present disclosure | Prepolymer 1 | 100 | | | | | 100 | | |
| | Prepolymer 2 | | 100 | | | | | | |
| | Prepolymer 3 | | | 100 | | | | 50 | 70 |
| | Prepolymer 4 | | | | 100 | | | 50 | 30 |
| | Prepolymer 5 | | | | | 100 | | | |
| other prepolymer | Prepolymer 6 | | | | | | | | |
| | Prepolymer 7 | | | | | | | | |
| | Prepolymer 8 | | | | | | | | |
| | Prepolymer 9 | | | | | | | | |
| | Prepolymer 10 | | | | | | | | |
| | Prepolymer 11 | | | | | | | | |
| | Prepolymer 12 | | | | | | | | |
| | Prepolymer 13 | | | | | | | | |
| | Prepolymer 14 | | | | | | | | |
| | Prepolymer 15 | | | | | | | | |
| | Prepolymer 16 | | | | | | | | |
| second maleimide resin | BMI-2300 | | | | | | | 7 | 16 | 15 |
| | MIR-3000 | | | | | | | 2 | 12 | 10 |
| | BANI-M | | | | | | | 1 | 7 | 6 |
| first maleimide resin | BMI-80 | | | | | | | | |
| siloxane compound | NH 30 D | | | | | | | | |
| diamine compound | APAB | | | | | | | | |
| curing accelerator | 2PHZ-PW | 0.3 | 0.3 | 0.3 | 0.3 | 0.3 | 0.3 | 0.2 | 0.5 |
| inorganic filler | SC2050 SMJ | R*180% | R*180% | R*180% | R*180% | R*180% | R*180% | R*170% | R*200% |
| solvent | MEK | R*150% | R*150% | R*150% | R*150% | R*150% | R*150% | R*140% | R*160% |

TABLE 3-continued

Resin compositions of Examples (in part by weight) and test results

| Property | Unit | E1 | E2 | E3 | E4 | E5 | E6 | E7 | E8 |
|---|---|---|---|---|---|---|---|---|---|
| resin compatibility | none | OK | OK | OK | OK | OK | OK | OK | OK |
| X-axis coefficient of thermal expansion | ppm/° C. | 3.31 | 4.21 | 2.85 | 3.33 | 3.01 | 3.61 | 3.81 | 3.35 |
| glass transition temperature | ° C. | 243 | 245 | 242 | 237 | 246 | 248 | 258 | 261 |
| copper foil peeling strength | lb/in | 2.0 | 2.3 | 1.5 | 1.7 | 2.3 | 2.2 | 2.8 | 3.1 |

TABLE 4

Resin compositions of Comparative Examples (in part by weight) and test results

| Component | Name | C1 | C2 | C3 | C4 | C5 | C6 | C7 |
|---|---|---|---|---|---|---|---|---|
| prepolymer of the present disclosure | Prepolymer 1 | | | | | | | |
| | Prepolymer 2 | | | | | | | |
| | Prepolymer 3 | | | | | | | |
| | Prepolymer 4 | | | | | | | |
| | Prepolymer 5 | | | | | | | |
| other prepolymer | Prepolymer 6 | 100 | | | | | | |
| | Prepolymer 7 | | 100 | | | | | |
| | Prepolymer 8 | | | 100 | | | | |
| | Prepolymer 9 | | | | 100 | | | |
| | Prepolymer 10 | | | | | 100 | | |
| | Prepolymer 11 | | | | | | 100 | |
| | Prepolymer 12 | | | | | | | 100 |
| | Prepolymer 13 | | | | | | | |
| | Prepolymer 14 | | | | | | | |
| | Prepolymer 15 | | | | | | | |
| | Prepolymer 16 | | | | | | | |
| second maleimide resin | BMI-2300 | | | | | | | |
| | MIR-3000 | | | | | | | |
| | BANI-M | | | | | | | |
| first maleimide resin | BMI-80 | | | | | | | |
| siloxane compound | NH 30 D | | | | | | | |
| diamine compound | APAB | | | | | | | |
| curing accelerator | 2PHZ-PW | 0.3 | 0.3 | 0.3 | 0.3 | 0.3 | 0.3 | 0.3 |
| inorganic filler | SC2050 SMJ | R*180% | R*180% | R*180% | R*180% | R*180% | R*180% | R*180% |
| solvent | MEK | R*150% | R*150% | R*150% | R*150% | R*150% | R*150% | R*150% |

| Property | Unit | C1 | C2 | C3 | C4 | C5 | C6 | C7 |
|---|---|---|---|---|---|---|---|---|
| resin compatibility | none | OK | NG | OK | NG | OK | NG | OK |
| X-axis coefficient of thermal expansion | ppm/° C. | 7.21 | — | 6.94 | — | 5.17 | — | 5.09 |
| glass transition temperature | ° C. | 242 | — | 241 | — | 243 | — | 243 |
| copper foil peeling strength | lb/in | 4.2 | — | 4.0 | — | 2.2 | — | 2.3 |

TABLE 5

Resin compositions of Comparative Examples (in part by weight) and test results

| Component | Name | C8 | C9 | C10 | C11 | C12 | C13 | C14 |
|---|---|---|---|---|---|---|---|---|
| prepolymer of the present disclosure | Prepolymer 1 | | | | | | | |
| | Prepolymer 2 | | | | | | | |
| | Prepolymer 3 | | | | | | | |
| | Prepolymer 4 | | | | | | | |
| | Prepolymer 5 | | | | | | | |
| other prepolymer | Prepolymer 6 | | | | | | | |
| | Prepolymer 7 | | | | | | | |
| | Prepolymer 8 | | | | | | | |
| | Prepolymer 9 | | | | | | | |
| | Prepolymer 10 | | | | | | | |
| | Prepolymer 11 | | | | | | | |

TABLE 5-continued

Resin compositions of Comparative Examples (in part by weight) and test results

|  |  | C8 | C9 | C10 | C11 | C12 | C13 | C14 |
|---|---|---|---|---|---|---|---|---|
|  | Prepolymer 12 |  |  |  |  |  |  |  |
|  | Prepolymer 13 | 100 |  |  |  | 100 |  |  |
|  | Prepolymer 14 |  | 100 | 100 |  |  |  |  |
|  | Prepolymer 15 |  |  |  | 100 |  |  |  |
|  | Prepolymer 16 |  |  |  |  |  |  | 100 |
| second maleimide resin | BMI-2300 |  |  | 7 | 7 | 7 |  |  |
|  | MIR-3000 |  |  | 2 | 2 | 2 |  |  |
|  | BANI-M |  |  | 1 | 1 | 1 |  |  |
| first maleimide resin | BMI-80 |  |  |  |  |  | 100 |  |
| siloxane compound | NH 30 D |  |  |  |  |  | 50 |  |
| diamine compound | APAB |  |  |  |  |  | 20 |  |
| curing accelerator | 2PHZ-PW | 0.3 | 0.3 | 0.3 | 0.3 | 0.3 | 0.3 | 0.3 |
| inorganic filler | SC2050 SMJ | R*180% | R*180% | R*180% | R*180% | R*180% | R*180% | R*180% |
| solvent | MEK | R*150% | R*150% | R*150% | R*150% | R*150% | R*150% | R*150% |
| Property | Unit | C8 | C9 | C10 | C11 | C12 | C13 | C14 |
| resin compatibility | none | NG | OK | OK | OK | NG | NG | OK |
| X-axis coefficient of thermal expansion | ppm/° C. | — | 4.67 | 5.26 | 4.82 | — | — | 5.12 |
| glass transition temperature | ° C. | — | 240 | 246 | 248 | — | — | 235 |
| copper foil peeling strength | lb/in | — | 2.2 | 3.1 | 2.1 | — | — | 1.8 |

Note:
The symbol "—" in the property column indicates that other property tests cannot be performed due to the layer separation of the resin composition.

Samples (specimens) for the properties measured above were prepared as described below and tested and analyzed under specified conditions below.

1. Prepreg (PP): Resin composition (in part by weight) from each Example E1-E8 or each Comparative Example C1-C14 was separately added to a stirred tank and well-mixed to form a varnish. Then the varnish was loaded to an impregnation tank, and a fiberglass fabric (e.g., 2118 T-glass fiber fabric, available from Asahi) was impregnated into the impregnation tank to adhere the resin composition onto the fiberglass fabric, followed by heating and baking at 110° C.-140° C. for about 2 to 3 minutes to obtain a prepreg, each prepreg made from the 2118 T-glass fiber fabric having a resin content of about 45%.
2. Copper-containing laminate 1 (i.e., copper-clad laminate 1, formed by lamination of one prepreg): Two 18 μm reverse treatment foils (RTFs) and one prepreg obtained from 2118 T-glass fiber fabric impregnated with each Example or Comparative Example were prepared, each prepreg having a resin content of about 45%. A copper foil, one prepreg and a copper foil were superimposed in such order and then subjected to a vacuum condition for lamination at 42 kgf/cm 2 pressure and 230° C. for 150 minutes to form each copper-containing laminate 1. A prepreg was cured to form an insulation layer between the two copper foils, and the insulation layer has a resin content of about 45%.
3. Copper-containing laminate 2 (formed by lamination of eight prepregs): Two 18 μm reverse treatment foils (RTFs) and eight prepregs obtained from 2118 T-glass fiber fabrics impregnated with each Example or Comparative Example were prepared, each prepreg having a resin content of about 45%. A copper foil, eight prepregs and a copper foil were superimposed in such order and then subjected to a vacuum condition for lamination at 42 kgf/cm 2 pressure and 230° C. for 150 minutes to form each copper-containing laminate 2. Insulation layers were formed by laminating eight sheets of prepreg between the two copper foils, and the resin content of the insulation layers is about 45%.
4. Copper-free laminate 1 (formed by lamination of one prepreg): Each aforesaid copper-containing laminate 1 was etched to remove the two copper foils to obtain a copper-free laminate 1 (formed by lamination of one prepreg), having a resin content of the insulation layer of about 45%.
5. Copper-free laminate 2 (formed by lamination of eight prepregs): Each aforesaid copper-containing laminate 2 was etched to remove the two copper foils to obtain a copper-free laminate 2 (formed by lamination of eight prepregs), having a resin content of the insulation layers of about 45%.

Test items and test methods are described below:

Resin Compatibility

In the measurement of resin compatibility, a resin composition containing the prepolymer and other resinous component was observed to determine whether layer separation occurs. A varnish was prepared from the components of the resin composition (excluding inorganic filler) of each Example from E1 to E8 or Comparative Example from C1 to C14; i.e., the varnish in this test did not contain inorganic filler. The varnish was mixed and stirred and then placed in a transparent glass bottle and stood still at room temperature (about 25° C.) for 3 hours; after that, the varnish was observed with naked eyes to determine whether layer separation occurs. If layer separation was observed (i.e., one or more interfaces were formed by the varnish), a designation of "NG" was given; if no layer separation was observed, a designation of "OK" was given.

X-Axis Coefficient of Thermal Expansion (X-CTE)

The copper-free laminate 1 (obtained by laminating one prepreg) sample was tested by thermal mechanical analysis (TMA) during the measurement of X-axis coefficient of thermal expansion. The copper-free laminate 1 was cut into a sample with a length of 10 mm and a width of 10 mm. Each sample was heated from 35° C. to 300° C. at a heating rate of 10° C./minute and then subjected to the measurement of the coefficient of thermal expansion (ppm/° C.) in X-axis in a temperature range (designated as a1) of 40° C. to 125° C. by reference to IPC-TM-650 2.4.24.5.

In the technical field to which the present disclosure pertains, lower X-axis coefficient of thermal expansion represents a better dimensional expansion property. A difference in X-axis coefficient of thermal expansion of greater than or equal to 0.2 ppm/° C. represents a substantial difference (i.e., significant technical difficulty) in X-axis coefficient of thermal expansion in different laminates. For example, articles made from the resin composition disclosed herein have an X-axis coefficient of thermal expansion as measured by reference to IPC-TM-650 2.4.24.5 of less than or equal to 4.21 ppm/° C., such as between 2.85 ppm/° C. and 4.21 ppm/° C.

Glass Transition Temperature (Tg)

The copper-free laminate 2 (obtained by laminating eight prepregs) sample was subjected to glass transition temperature measurement by using the thermal mechanical analysis (TMA) method. Each sample was heated from 35° C. to 350° C. at a heating rate of 10° C./minute and then subjected to the measurement of glass transition temperature (° C.) by reference to the method described in IPC-TM-650 2.4.24.5.

In the technical field to which the present disclosure pertains, higher glass transition temperature is better. A difference in glass transition temperature of greater than or equal to 5° C. represents a substantial difference (i.e., significant technical difficulty) in glass transition temperature in different laminates. For example, articles made from the resin composition disclosed herein have a glass transition temperature of greater than or equal to 237° C. as measured by reference to IPC-TM-650 2.4.24.5, such as between 237° C. and 261° C.

Copper Foil Peeling Strength (a.k.a. Peeling Strength, P/S)

In the copper foil peeling strength test, the copper-containing laminate 2 (obtained by laminating eight prepregs) was cut into a rectangular specimen with a width of 24 mm and a length of greater than 60 mm, which was etched to remove surface copper foil, leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate.

In the technical field to which the present disclosure pertains, higher copper foil peeling strength is better. A difference in copper foil peeling strength of greater than or equal to 0.2 lb/in represents a substantial difference (i.e., significant technical difficulty) in copper foil peeling strength in different laminates. For example, articles made from the resin composition disclosed herein have a copper foil peeling strength as measured by reference to IPC-TM-650 2.4.8 of greater than or equal to 1.5 lb/in, such as between 1.5 lb/in and 3.1 lb/in.

The following observations can be made from Table 3 to Table 5.

If the resin composition comprises a prepolymer formed by 100 parts by weight of a first maleimide resin, 40 to 60 parts by weight of a siloxane compound and 10 to 30 parts by weight of a diamine compound, wherein the first maleimide resin comprises bisphenol A diphenyl ether bismaleimide, the siloxane compound comprises a compound of Formula (I) (wherein 26≤n≤32, and n is a positive integer, having a molecular weight of 2200 to 2600 g/mol), and the diamine compound comprises 4-aminophenyl-4-aminobenzoate (APAB), such as Examples E1 to E8, the resin composition can achieve at the same time desirable properties including no layer separation in a resin compatibility test and an X-axis coefficient of thermal expansion of less than or equal to 4.21 ppm/° C. In contrast, Comparative Examples C1-C14 fail to achieve desirable results in at least one of the properties including resin compatibility test and X-axis coefficient of thermal expansion.

In contrast to Example E1, if the prepolymer does not contain the siloxane compound of Formula (I) having a molecular weight of 2200 to 2600 g/mol disclosed herein but contains other siloxane compounds, such as Comparative Example C1, it will fail to achieve desirable improvement in X-axis coefficient of thermal expansion.

In contrast to Example E1, if the prepolymer does not contain the siloxane compound of Formula (I) having a molecular weight of 2200 to 2600 g/mol disclosed herein but contains other siloxane compounds, such as Comparative Example C2, it will fail to achieve desirable improvement in resin compatibility test.

In contrast to Example E1, if the prepolymer does not contain the siloxane compound of Formula (I) having a molecular weight of 2200 to 2600 g/mol disclosed herein but contains other siloxane compounds, such as Comparative Example C3, it will fail to achieve desirable improvement in X-axis coefficient of thermal expansion.

In contrast to Example E1, if the prepolymer does not contain the siloxane compound of Formula (I) having a molecular weight of 2200 to 2600 g/mol disclosed herein but contains other siloxane compounds, such as Comparative Example C4, it will fail to achieve desirable improvement in resin compatibility test.

In contrast to Example E1, if the prepolymer does not contain 4-aminophenyl-4-aminobenzoate (APAB) as a diamine compound but contains other amine compounds, such as Comparative Example C5, it will fail to achieve desirable improvement in X-axis coefficient of thermal expansion.

In contrast to Example E1, if the prepolymer does not contain APAB as a diamine compound but contains other amine compounds, such as Comparative Example C6, it will fail to achieve desirable improvement in resin compatibility test.

In contrast to Example E1, if the prepolymer does not contain APAB as a diamine compound but contains other amine compounds, such as Comparative Example C7, it will fail to achieve desirable improvement in X-axis coefficient of thermal expansion.

In contrast to Example E1, if the prepolymer does not contain the siloxane compound of Formula (I) having a molecular weight of 2200 to 2600 g/mol disclosed herein in conjunction with APAB as a diamine compound but contains other siloxane compounds in conjunction with other amine compounds, such as Comparative Example C8, it will fail to achieve desirable improvement in resin compatibility test.

In contrast to Example E4, if the prepolymer does not contain 40 to 60 parts by weight of the siloxane compound but contains 30 parts by weight of the siloxane compound, such as Comparative Example C9, it will fail to achieve desirable improvement in X-axis coefficient of thermal expansion.

In contrast to Example E6, if the prepolymer does not contain 40 to 60 parts by weight of the siloxane compound in conjunction with a diamine compound but contains 30 parts by weight of the siloxane compound in conjunction with a diamine compound, such as Comparative Example C10, it will fail to achieve desirable improvement in X-axis coefficient of thermal expansion.

In contrast to Example E6, if the prepolymer does not contain APAB as a diamine compound but contains other amine compounds, such as Comparative Example C11, it will fail to achieve desirable improvement in X-axis coefficient of thermal expansion.

In contrast to Example E6, if the prepolymer does not contain the siloxane compound of Formula (I) having a molecular weight of 2200 to 2600 g/mol disclosed herein in conjunction with APAB as a diamine compound but contains other siloxane compounds in conjunction with other amine compounds, such as Comparative Example C12, it will fail to achieve desirable improvement in resin compatibility test.

In contrast to Example E1, if the prepolymer of the present disclosure is not used but monomers of the prepolymer are separately added instead, such as Comparative Example C13, it will fail to achieve desirable improvement in resin compatibility test.

In contrast to Example E1, if the prepolymer does not contain bisphenol A diphenyl ether bismaleimide as a first maleimide resin but contains a different maleimide resin, such as Comparative Example C14, it will fail to achieve desirable improvement in X-axis coefficient of thermal expansion.

Overall, the resin composition of the present disclosure or articles made therefrom may achieve at the same time desirable properties including no layer separation in a resin compatibility test, an X-axis coefficient of thermal expansion of less than or equal to 4.21 ppm/° C., a glass transition temperature of greater than or equal to 237° C. and a copper foil peeling strength of greater than or equal to 1.5 lb/in.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition comprising a prepolymer which is prepared from a mixture subjected to a prepolymerization reaction, the mixture comprising 100 parts by weight of a first maleimide resin, 40 to 60 parts by weight of a siloxane compound and 10 to 30 parts by weight of a diamine compound, wherein:
the first maleimide resin comprises bisphenol A diphenyl ether bismaleimide;
the siloxane compound comprises a compound of Formula (I), having a molecular weight of 2200 to 2600 g/mol,

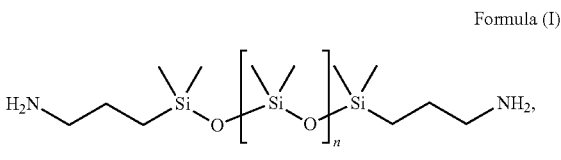

Formula (I)

wherein 26≤n≤32, and n is a positive integer; and
the diamine compound comprises 4-aminophenyl-4-aminobenzoate.

2. The resin composition of claim 1, further comprising a second maleimide resin.

3. The resin composition of claim 2, comprising 100 parts by weight of the prepolymer and 10 to 35 parts by weight of the second maleimide resin.

4. The resin composition of claim 2, wherein the second maleimide resin comprises polyphenylmethane maleimide, biphenyl aralkyl maleimide, diallyl nadiimide or a combination thereof.

5. The resin composition of claim 1, further comprising inorganic filler, flame retardant, curing accelerator, polymerization inhibitor, solvent, silane coupling agent, coloring agent, toughening agent or a combination thereof.

6. An article made from the resin composition of claim 1, comprising a varnish, a prepreg, a resin film, a laminate or a printed circuit board.

7. The article of claim 6, wherein no layer separation occurs after standing still the varnish at room temperature for 3 hours in a resin compatibility test.

8. The article of claim 6, having an X-axis coefficient of thermal expansion as measured by reference to IPC-TM-650 2.4.24.5 of less than or equal to 4.21 ppm/° C.

* * * * *